Sept. 17, 1935.  F. W. SCHMIDT  2,014,865
COMPOSITE BRAKE DRUM AND METHOD OF MAKING THE SAME
Filed March 26, 1932
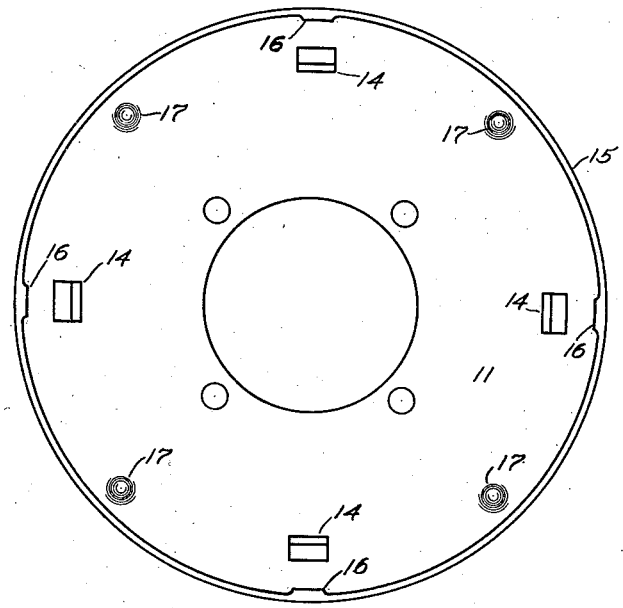
Fig. I
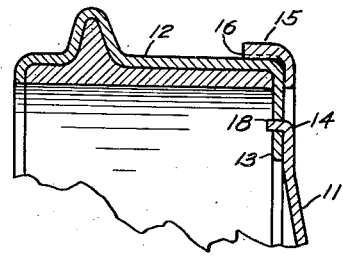
Fig. II
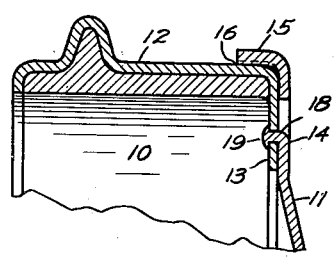
Fig. III
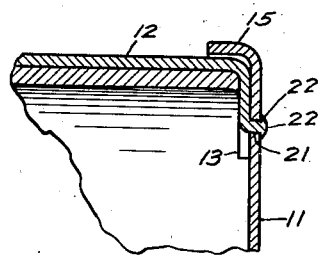
Fig. IV
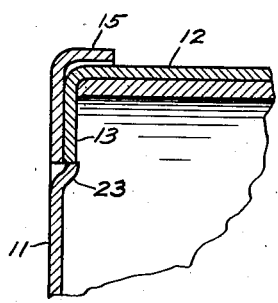
Fig. V
INVENTOR.
Frank W. Schmidt.
BY Carroll R. Taber
HIS ATTORNEY.

Patented Sept. 17, 1935

2,014,865

UNITED STATES PATENT OFFICE 2,014,865

COMPOSITE BRAKE DRUM AND METHOD OF MAKING THE SAME

Frank W. Schmidt, Lansing, Mich., assignor to Motor Wheel Corporation, Lansing, Mich., a corporation of Michigan Application March 26, 1932, Serial No. 601,423

2 Claims. (Cl. 29—152.2)

REISSUED

This invention relates to a method of forming composite brake drums and more particularly to a novel method for securing a brake drum web to a brake ring. The principal object of the present invention is to provide a method for securing a brake drum web to a brake ring in a manner whereby an unusually strong composite brake drum is formed. Another object of the invention is the provision of a method of forming a composite brake drum wherein a brake ring and a brake drum web are secured together by means of rivet-like projections formed in one of these parts extending through openings formed in the other part. A further object of the invention is the provision of a method of securing a brake web to a brake ring which includes riveting and welding the parts together. Other objects more or less identical and ancillary to the foregoing will appear in the following description and claims.

For a better understanding of the invention reference may now be had to the accompanying drawing in which:

Fig. I is a front view in elevation of a brake drum web which may be used in practicing the invention.

Fig. II is a partial sectional view through a composite brake drum showing the position of the parts before being riveted together;

Fig. III is a view similar to Fig. II showing the parts after being riveted together; and Figs. IV and V illustrate modified methods of securing a brake drum web to a brake ring.

The composite brake drum 10 illustrated in Fig. III is formed by securing a substantially circular brake drum web 11 to a cylindrical brake ring having an inturned flange 13 at one edge thereof. The web 11 is provided with a laterally extending flange 15, and as best shown in Fig. I, has a plurality of circumferentially spaced apart rivet-like or tongue-like projections 14 cut out of and bent away from the body thereof. The peripheral flange 15 may be provided with a plurality of centering and leakage projections 16 which serve a purpose to be described presently. A plurality of welding projections 17 are formed in the body of the web 11 intermediate the rivet-like projections 14.

The brake drum web 11 is secured to the brake ring 12 by assembling these parts as indicated in Fig. II with the peripheral flange 15 of the web encircling the external surface of the ring 12 and with the rivet-like projections 14 extending through complementary openings 18 formed in the inturned flange 13 of the brake ring, whereby the brake ring is supported by the rivet-like projections. The internal circumference of the peripheral flange 15 is slightly greater than the external circumference of the brake ring 12 so that at least some of the centering and leakage projections 16 contact the outer surface of the brake ring and prevent the peripheral flange from contacting with the brake ring at any other points.

After the brake ring and web have been assembled as just described with the rivet-like projections 14 extending through the openings 18, the web is secured to the flange 13 of the brake ring 12 by passing an electric current through these parts at the points of contact between the welding projection 17 and the flange 13, whereby to effect welds at these points.

During the welding process the projections 16 contacting with the brake ring 12 and the rivet-like projections 14 contacting with the flange 13 serve to center the respective parts and to control the amount of leakage of electric current so that satisfactory welds are assured at the desired welding points.

After the web has been welded to the brake ring flange as just described the free extremity of the rivet-like projections 14 extend through the openings 18 in the flange 13 as illustrated in Fig. II. These free extremities are then flattened by any suitable operation to form heads 19 whereby to provide additional means for securing the web to the brake ring. If desired, the peripheral flange 15 may be eliminated from the web 11 and the web be secured to the brake ring flange by means of the rivet-like projections 18 and the welds formed at the point of contact of the welding projections 17. Likewise, the welding operation may be omitted and the web, preferably including the peripheral flange 15, may be secured to the brake ring solely by means of the rivet-like projections extending through openings in the brake ring flange 13. The ring flange is thus locked in position both by the clamping action of the peripheral flange and the rivet projections and also by the rivet projections themselves.

As shown in Fig. IV a plurality of circumferentially spaced apart rivet-like projections 20 may be cut out of and bent away from the inturned flange 13 of the brake ring 12. The web 11 will then be provided with a plurality of circumferentially spaced apart openings 21 for the reception of the rivet-like projections 20, the free extremities of which are flattened out to form heads 22 whereby to secure the brake ring to the web. The inturned flange 13 of the brake ring 12 may also be welded at a plurality of desired points to the web as was described in connection with the composite brake drum illustrated in Figs. I, II and III.

Another method of securing the brake drum web 11 to the brake ring 12 is illustrated in Fig. V. In this modification a plurality of circumferentially spaced apart rivet-like projections 23 are cut out of and bent partially away from the body of the web 11 and the inner periphery of the inturned flange 13 of the brake ring 12 is seated upon the free extremity of these projections. The brake ring 12 may then be secured to the web 11 by means of projection welding, as described in connection with the composite brake drum illustrated in Figs. I, II and III, or by means of welding the free extremity of the rivet-like projection 23 to the inner peripheral edge of the inturned flange 13.

While only certain of the preferred methods of practicing the invention are shown and described, it should be understood that the invention is not limited thereto but is coextensive with the scope of the appended claims.

I claim:

1. The method of forming a composite brake drum which comprises providing a cylindrical brake ring having an inturned flange at one edge thereof, forming a plurality of circumferentially spaced apart openings in the said flange, providing a circular brake drum web having a laterally extending peripheral flange, forming a plurality of circumferentially spaced apart centering and leakage projections in the said peripheral flange, forming a plurality of circumferentially spaced apart rivet-like projections in the web, forming a plurality of welding projections intermediate the said rivet-like projections, assembling the web and brake ring with at least some of the centering projections carried by the peripheral flange of the former contacting the external surface of the latter and with the aforesaid rivet-like projections extending through the openings in the flange of the brake ring, flattening the ends of the rivet-like projections against the inner surface of the flange of the brake ring, and passing an electric current through the web and the flange of the brake ring at the point of contact between the said flange and the welding projections carried by the web.

2. A brake drum comprising a brake ring having a flange at one edge thereof, a web for supporting the ring, said web having integral projections located radially inwardly of its periphery extending through and contacting the opposite surfaces of the flange to secure the web thereto, said web also having a peripheral flange contacting the ring radially outwardly of said integral projections.

FRANK W. SCHMIDT.